United States Patent Office 3,551,530
Patented Dec. 29, 1970

3,551,530
ASYMMETRIC ALKALINE EARTH METAL
PHENATE-PHOSPHITES AND METHOD
OF MAKING SAME
Gordon M. Juredine, Cleveland Heights, Ohio, assignor to Synthetic Products Company, Cleveland, Ohio, a corporation of Ohio
No Drawing. Original application Dec. 5, 1966, Ser. No. 599,416. Divided and this application Aug. 15, 1967, Ser. No. 660,615
Int. Cl. C07f 9/12; C08f 45/58; C10i 1/26
U.S. Cl. 260—967                                11 Claims

ABSTRACT OF THE DISCLOSURE

Asymmetric alkaline earth metal phenate-phosphites useful in stabilizing high polymers, oils and various materials against degradation are prepared by reacting in a solvent-diluent around equal molar amounts of a phenol, an alkaline earth metal hydroxide and a phosphite having all three oxygen valences connected to hydrocarbon or halogenated hydrocarbon radicals of 4 to 18 carbon atoms and at least one of said oxygen valences connected to aryl or aralkyl. Alternatively, equal moles of the metal hydroxide and phenol may be first reacted and the resulting product reacted with the phosphite. The superior compatibility of the asymmetric phenate-phosphites with vinyl polymers reduces or eliminates the tendency of migration of stabilizer to the surface of articles where it degrades surfaces and interferes with heat-sealing.

---

This application is a division of my copending application Ser. No. 599,416, filed Dec. 5, 1966. The invention relates to compounds useful for the stabilization of high polymers, particularly vinyl halide polymers, to methods or processes of making said compounds, to compositions including said compounds, and to products such as high polymers stabilized with said compounds and compositions. More particularly, it relates to asymmetric alkaline earth metal phenate-phosphites, to methods of making said phosphites, and to compositions stabilized with said asymmetric phosphites.

An important utilization of alkaline earth metal salts is in the field of vinyl halide resin additives, where alkaline earths are used rather generally as stabilizers or as components with other materials in stabilizing systems for vinyl resins in the form of carboxylates. These alkaline earth carboxylates, along with the important stabilizing effects of the metal, have a degree of incompatibility due to the heretofore unavoidable excess of carboxylate that accompanies the metal. This is evidenced by the migration of unassimilated carboxylate to the surfaces of the vinyl resin compound during curing and processing to cause undesirable plate-out on the carrying equipment and to cause undesirable scum that exudes on exposure and aging of the vinyl plastic to weathering. Such exudations undesirably interfere with both decorative or utile printing and heat-sealing of the vinyl plastic.

The plate-out is noticed as a mist or as a deposit on molds and calendar rolls and cause the production of molded objects and sheets with imperfect surfaces. It also requires considerable expense due to undesired cleaning of molds, casting surfaces, calender rolls and the like. This trouble is caused by the presence of two molecular equivalents of carboxylic acid for each mole of alkaline earth metal used as stabilizer. When the required amount of alkaline earth metal is present to stabilize the vinyl resin during processing and in the finished plastic, the amount of carboxylate is always an excess over what can apparently be contained compatibly in the resin.

Alkaline earth metal phenates have also been used in admixture with the carboxylates to accomplish similar results, as well as sometimes an increased benefit. These phenates, while more compatible with the resins than the carboxylates, also tend to plate-out to an undesirable extent.

Formulators and compounders in the vinyl industry have been obliged to contend with this problem whenever they required the presence of an alkaline earth stabilizer, and have made recourse to tedious and complicated correctives to overcome it, not always with the assurance of success. If the resin is fused and cured at 350° to 400° F. or higher, the plate-out is reduced. However, this requires exacting control which is very often impractical in factory operations, and such temperatures even for short times result in some degradation of the vinyl polymer, even under the best conditions.

In my prior applications, I showed that the difficulties were avoided by making and incorporating into high polymers, such as polyvinyl chloride, an asymmetric alkaline earth metal carboxylate-phosphite of the general formula:

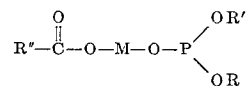

where R and R″ are selected from alkyl, cycloaliphatic, aryl, aralkyl and alkaryl radicals, and where R has four to 18 carbon atoms.

It is a primary object of the present invention to avoid the difficulties alluded to hereinabove and to provide a new alkaline earth phenate stabilizer compound which is suitable for stabilizing vinyl halide polymers and other materials and which does not exhibit plate-out from polymers over an extended period of time and which does not exhibit undesirable surface scum nor interferences to printing or heat-sealing.

Another object of this invention is to provide novel methods for making these alkaline earth metal phenate compounds.

Yet another object is to provide compositions useful for stabilizing vinyl halide polymers and including a novel alkaline earth metal phenate stabilizer compound.

A still further object is to provide a new composition of a vinyl halide polymer containing said alkaline earth metal phenate compound as a stabilizer and which does not exhibit undesirable plate-out, surface scum or weathering, nor interference to printing or heat-sealing.

These and other objects and advantages of the present invention will become more apparent to those skilled in the art from the following detailed description and examples.

According to the present invention, it has been discovered that vinyl halide polymers can be heat-stabilized in a superior manner with an asymmetric alkaline earth metal phenate-phosphite, of the general formula:

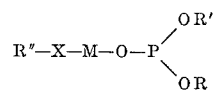

where M is an alkaline earth metal (Ca, Ba, or Sr), preferably Ba, R and R′ have four to eighteen carbon atoms and are selected from the group consisting of alkyl, such as butyl, octyl and hexadecyl; aryl, such as phenyl and naphthyl; cycloaliphatic, such as cyclo-hexyl; alkaryl, preferably having 8 to 12 carbons in the alkyl group thereof, as nonylphenyl; and aralkyl, such as benzyl, phenylnonyl radicals and others which preferably have 8 to 12, inclusive, atoms in the alkyl group thereof, and their halogen-substituted derivatives, and R″—X— is selected from the group consisting of radicals of phenol, substituted phenol, thiophenol, and substituted thiophenol. Substituted phenols include the various chlorphenols, including the ortho, meta and para chlorphenols, the various aminophenols, including para-aminophenol, the various methoxy phenols, including meta and para methoxy phenols, the alkyl-substituted phenols, such as nonyl and octyl phenols, the cresyls and substituted-cresyls, such as nonylcresyl, and the corresponding substituted-thiophenols. The substituents in the phenol radical may have up to a total of ninteen carbon atoms, of which a maximum of eighteen may be in one alkyl group. However, such alkyl substituents are preferably of 8 to 12, inclusive carbon atoms. Moreover, vinyl halide polymers stabilized with these asymmetric alkaline earth metal phenate-organic phosphite compounds do not exhibit plate-out over extended periods of time, do not show surface scum nor feel slimy to the touch after aging, and do not exhibit undesirable surface interference to satisfactory surface printing or heat-sealing, as compared to vinyl halide polymers containing the usual alkaline earth metal carboxylic acid salt and/or alkaline earth metal phenate, alone or with an organic phosphite.

Thus, the problems alluded to hereinabove are avoided when these asymmetric alkaline earth metal phenate-phosphites are employed in vinyl halide polymers as stabilizers or are employed in conjunction with other materials, such as conventional polyvinyl halide stabilizers of the class of cadmium, zinc and/or tin salts of organic acids, with or without organic phosphites, to form stabilizing systems for vinyl halide polymers. Such asymmetric metal phenate-phosphites contain only about half of the phenol radical content heretofore accompanying the alkaline earth metal.

Although the reaction to produce these asymmetric phenate-phosphites appears to be almost quantitative, it, of course, is possible that side reactions can occur or that the reactants may not have completely reacted, and also small amounts of raw materials may be present, including some alkaline earth metal hydroxide, free phosphite and free phenol. Such small residues are fully compatible for practical purposes during the processing of the vinyl resin and during aging of the vinyl plastic. The selected phosphites employed in the other half of the asymmetric alkaline earth metal salts and phenates to balance the requirement of the alkaline earth metal valency are known to be in themselves compatible in vinyl resins. Mixtures of these new asymmetric stabilizers can be used as well as mixtures of these with asymmetric alkaline earth metal carboxylate-phosphites, and/or with small amounts of alkaline earth metal carboxylates and/or some small amounts of organic phosphites.

Examples of these asymmetric alkaline earth metal phenate-phosphite compounds falling within the scope of this invention are barium phenate-diphenyl phosphite, barium nonylphenate-diphenyl phosphite, barium chlorophenate-dibutyl phosphite, barium octylphenate-ditolyl phosphite, barium butylphenate-benzyl methyl phosphite, barium cresylate-phenyl tolyl phosphite, barium hexyldecylphenate-cyclopentyl phenyl phosphite, barium thiophenate-diiodophenyl phosphite, barium nonylphenate-octyl phenyl phosphite, barium hexylphenate-diphenyl phosphite, barium octylphenate-octylphenyl phosphite, barium nonylphenate-bis(nonylphenyl)phosphite, barium orthononylphenate-dicyclohexyl methyl phosphite, barium aminophenate-difluorobutyl phosphite, barium dodecylphenate-butylphenyl phosphite, barium thiophenate-ditolyl phosphite, barium metanonylphenate - tridecyl phenyl phosphite, barium nonylthiophenate-octylphenyl phosphite, barium phenate-diphenyl phosphite, barium methoxyphenate-bis-nonylphenyl)phosphite, barium phenate-bromohexyl tolyl phosphite, barium paracresylate-diphenyl phosphite, barium phenate-octyl phenyl phosphite, barium thiophenate-dichloropentyl phosphite, barium para-nonylphenate - bis(dodecylphenyl)phosphite, the corresponding calcium and the corresponding strontium compounds, and the like.

These asymmetric alkaline earth metal phosphite phenates can readily be prepared by dispersing in a particular diluent and/or solvent (preferably boiling above 300° F.) the alkaline earth metal hydroxide [Ba(OH)$_2$, Ca(OH)$_2$, or Sr(OH)$_2$, or mixtures thereof including their hydrates] and then the required phenol (or thiophenol) is mixed in this dispersion at room temperature. The temperature is then preferably elevated to above 220° F., generally 250 to 300° F., for a few minutes to accelerate the combination of alkali metal and phenol. The mixture is then preferably cooled somewhat, say to about 210° F. or so and the desired organic phosphite added. When the exothermic reaction started reaches its peak, external heat is preferably applied to maintain a temperature of around 250 to 300° F. for a few minutes, agitation is stopped, the batch cooled somewhat and filtered. The solution contains the asymmetric alkaline earth phenate-phosphite.

In some instances it may not be necessary to apply external heat to the mixture. However, for practical usage, to speed the reaction and to increase the fluidity of the mass, heat is generally applied to the mixture. Temperatures, thus, can be from about 50 to 400° F. Preferred temperatures are from about 85 to 300° F. although somewhat higher temperatures can be employed, temperatures should not be so high as to cause volatilization or degradation of the reactants, diluents and/or solvents, or products.

At the end of the above reaction, the asymmetric alkaline earth metal phenate-phosphite can be separated readily from the other materials present. However, this is not generally necessary since the small amount of water present, if not evolved during the reaction, is not deleterious in the vinyl halide polymer and in many instances will be removed during compounding and processing. Also, the water can be bound to or complexed with any free phosphite and sometimes with the asymmetric alkaline earth metal phenate-phosphite. The phenols produced are compatible with the vinyl halide polymers and may afford some antioxidant activity. Where diluents such as hydrocarbons and/or ethers are employed, these are also compatible with the vinyl halide polymers and can be retained.

In general, the organic phosphite, phenol and alkaline earth metal hydroxide are used in essentially equal molar quantities. For example, the reaction can proceed as follows:

$$M(OH)_2 + R''OH + P\begin{matrix}-O-R''' \\ -O-R \\ -O-R'\end{matrix} \longrightarrow$$

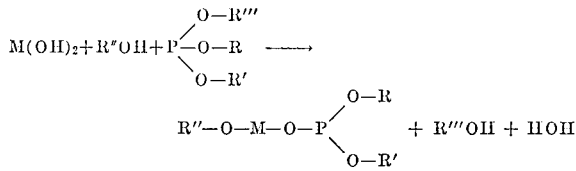

M, R, R' and R'' have the same significance as indicated supra; R''', however, is always selected from the group consisting of aryl and alkaryl radicals.

In preparing these asymmetric stabilizers, special equipment is not ordinarily required. The reactants may simply be reacted in a vessel open to the atmosphere or if desired under reflux. Inert atmospheres and so forth are not usually required. Agitation is desirable during at least a portion of the reaction. Since some of the materials used in the preparation may be flammable, such as the diluents, precautions should be observed by using water baths or steam for heating. If the exothermic heat of reaction becomes too high, cooling means should be provided.

The asymmetric alkaline earth metal phenate-phosphite is mixed with the vinyl halide polymer only in a minor amount by weight, alone or with other known stabilizers, sufficient to heat-stabilize the vinyl halide polymer. In general, there can be used from about 0.1 to 10 parts by weight of the asymmetric alkaline earth metal phenate-phosphite stabilizer of the present invention based on 100 parts by total weight of the vinyl halide polymer.

Organic phosphites for use in the practice of the present invention have the following general formula:

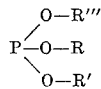

In the formula, R and R' are selected from the group consisting of alkyl, cycloaliphatic, aryl, aralkyl, and alkaryl radicals and their halogen-substituted derivatives having from 4 to 18 carbon atoms; and R''' is selected from the group consisting of aryl and alkaryl radicals and their halogen-substituted derivatives having from 6 to 18 carbon atoms. Mixtures of those phosphates can be used. Examples of phosphites falling within this formula are dibutyl phenyl phosphite, diheptyl phenyl phosphite, butyl diphenyl phosphite, isobutyl diphenyl phosphite, hexyl diphenyl phosphite, amyl ditolyl posphite, triphenyl phosphite, octyl diphenyl phosphite, tris(nonylphenyl)phosphite, trixylyl phosphite, dibenzyl phenyl phosphite, dicyclopentyl phenyl phosphite, di(cyclohexyl methyl) phenyl phosphite, di(cyclopentyl propyl)tolyl phosphite, monochlorodecyl diphenyl phosphite, trichloro-phenyl phosphite, tribromo-octyldecyl ditolyl phosphite, tetrafluoro-octyl diphenyl phosphite, di(monofluorooctyl)naphthyl phosphite, dodecyl diphenyl phosphite, nonyl diphenyl phosphite, tetradecyl ditolyl phosphite, and so forth. It is preferred that the halogen derivatives be monohalogen-substituted and, more preferably, be monochloro-substituted.

The organic phosphite are well-known to the art. They can readily be derived from mixtures of alcohols and phenols, substituted phenols, and so forth, by reaction with phosphorous trichloride and separating the resulting organic chloride from the organic phosphite.

Diluents can be one or more inert, relatively high boiling point hydrocarbons and/or ethers and mixtures of the same which are liquid at the reaction temperatures and which perform the function of diluents as well as solvent. Examples of the ethers and hydrocarbons which may also act as plasticizers in the vinyl halide polymer are tripropylene glycol methyl ether, ethylene glycol monoethyl ether, ethylene glycol phenyl ether, ethylene glycol monomethyl ether, ethylene glycol monobutyl ether, diethylene glycol monomethyl ether, diethylene glycol monoethyl ether, diethylene glycol monobutyl ether, propylene glycol methyl ether, dipropylene glycol methyl ether, ethylene glycol para(sec.)butyl phenyl ether, ethylene glycol para(tert.)butyl phenyl ether, dipropylene glycol phenyl ether, propylene glycol ortho chlorophenyl ether, propylene glycol para(sec.)butyl phenyl ether, propylene glycol ortho(sec.)butyl phenyl ether, propylene glycol para(tert.)butyl phenyl ether, propylene glycol 4-biphenyl ether, propylene glycol p-cyclohexyl phenyl ether, propylene glycol p-chloro phenyl ether, propylene glycol 2,4-dichlorophenyl ether, benzyl butyl ether, diethylene glycol diethyl ether, 2-butoxy toluene, 1-phenoxy heptane, octyl ether, toluene, cycloheptane, 3-methyl octane, ethyl benzene, the xylenes, cumene, undecase, tetralin, anisole, ter. amyl benzene, diethyl benzene, isohexyl benzene, 3-methyl biphenyl, 1,3-dimethyl cyclohexane, 2,6-dimethyl heptane, dodecane, octane, pentadecane, and so forth, and mixtures thereof. These diluents and/or solvents should have a boiling point of at least 230° F. for best results a mixture of the hydrocarbon and ether diluent and/or solvent should be used. Excess phosphite can be used to speed the reaction and serves to some extent as a diluent but does not avoid the necessity for using an ether and/or hydrocarbon diluent. When ethers are used alone as diluent, it is desirable to have a mixture of relatively high and low boiling point ethers. Likewise, when hydrocarbons are being used alone, a mixture of relatively high and low boiling point hydrocarbons should desirably be employed. These solvents and/or diluents are employed in an amount sufficient to give the desired fluidity and solvency to the reaction mass and to facilitate handling. In general, the amount of diluent may vary from about 20 to 80% by weight of the reaction mixture. The use of these diluents also aids in later mixing asymmetric stabilizers with the resin, plastisols and so forth.

An alternative method for making the asymmetric alkaline earth metal phenate-phosphites is to react the starting materials in stages. This is somewhat less desirable since extra steps and extra heat are involved and sometimes the final product exhibits plate-out after extended use because of poor reaction efficiency and because more of a mixture is obtained rather than an asymmetric compound. However, such method may be more convenient to employ for some manufacturing purposes and end uses. For example, the alkaline earth metal hydroxide and the phenol are reacted in the diluent as follows:

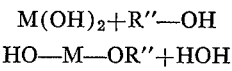

where R'' and M have the significance as defined supra. The water may or may not be separated from the resulting product. The "mixed" half phenate of the metal (i.e., basic barium phenate, basic strontium phenate, basic calcium phenate, and so forth, corresponding to the foregoing metal hydroxides and phenol) is then reacted with the desired organic phosphite as follows:

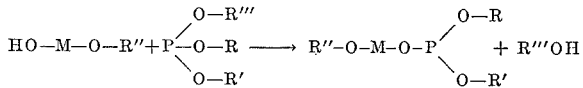

where M, R, R', R'' and R''' have hte significance as defined above. The basic alkaline earth phenate can be obtained by the method as shown above or by any other method known to those skilled in the art. The mol ratios employed and the temperatures used are essentially the same as shown supra.

Polymers to be stabilized with the stabilizers of this invention can be any vinyl halide polymer obtained by polymerizing a polymerizable vinyl halide monomer, including mixtures of these monomers, such as vinyl fluoride, vinyl chloride, and vinyl bromides, and copolymers of a major (total) amount of one or more of these vinyl halide monomers and a minor amount, preferably not over 15%, of at least one other copolymerizable monomeric material having from one to two polymerizable $H_2C=C<$ groups. Examples of monomers copolymerizable with these vinyl halide monomers in minor amounts are vinyl acetate, vinylidene fluoride, vinylidene chloride, vinylidene bromide, allyl alcohol, 3-butene-1-ol, phenyl vinyl ether, allyl acetone, diallyl malonate, diallyl malate, diallyl phthalate, divinyl ether, trichlorofluoro-ethylene, diallyl ether, acrylonitrile, methacrylonitrile, chloroacrylonitrile and the like, and mixtures thereof. It is understood that the term "polymer" includes copolymer, interpolymer, terpolymer and graft polymer, etc. Mixtures of these polymers, copolymers, and the like, can be used. Preferred are polymers prepared from vinyl chloride, or a major amount by weight of vinyl chloride and a minor amount by weight of vinylidene chloride or vinyl acetate, for example a polymer of from about 86% to 98% by weight of vinyl chloride and from about 14% to 2% by weight of vinyl acetate. The vinyl halide monomers have the formula $H_2C=CHX$, where X is fluorine, chlorine or bromine.

These polymers can be obtained by bulk, emulsion, solution or suspension polymerization by procedures well-known to the art. The polymers to be stabilized can be any one or more of the calender grade, plastisol grade, coating grade, blotter type resins and so forth.

These stabilized vinyl halide polymers, furthermore, can be plasticized with well-known plasticizers such as dioctyl phthalate, tricresyl phosphate, the nonmigratory polyester plasticizers, the paraplexes, di-2-ethyl butyl azelate, dipropylene glycol dibenzoate, chlorinated biphenyl, epoxy-type plasticizers, triethylene glycol di-(2-ethyl hexoate), chlorinated paraffin, n-butyl acetyl ricinoleate, butyl acetoxy stearate, and others well-known to the art. Other stabilizers, antidegradants (antioxidants), ultraviolet absorbers, fillers, rubbers, resins, pigments, dyes, fungicides and other compounding ingredients can be mixed and blended with these polymers as is customary in the art. Examples of the same are epoxidized soybean oil and other epoxidized oils and esters, the orthohydroxy benzophenones, the alkylated 2-hydroxy phenyl benzotriazoles, aryl amines, alkylated phenols, 2,6-ditertiary butyl paracresol, carbon black, titanium dioxide, magnesium oxide, antimony oxide, silica, calcium, silicate, phthalocyanine blue or green, mica, wood cellulose, glass fibers, metal flakes, styrene-acrylonitrile copolymers, butadiene-acrylonitrile copolymers, rubbery polyesterurethanes, rubbery polyether-urethanes, acrylonitrile-butadiene - 1,3 - styrene graft polymers or copolymers and so forth, and mixtures of the same. The inorganic pigments and fillers may or may not, previous to addition to the polymer have been treated with a coating or surface treating agent, such as a hydrolyzable organosilane, such as vinyl trichlorsilane, vinyl trisbetamethoxy-ethoxy silane, and other silanes containing a vinyl group, including the methacrylic ester of gammahydroxy trimethoxysilane. Even saturated hydrolyzable silanes are sometimes desirable. Pigments may also be treated with any of the alcohols or polyhydroxy compounds, isocyanates or polyisocyanates, amines or polyamines, etc.

As noted above, the asymmetric alkaline earth metal stabilizers of this invention can be used with other known polyvinyl halide stabilizers to obtain the benefits of such known stabilizers. These other heat and light stabilizers can be any of the cadmium (II), tin (II) and zinc salts of organic acids useful as polyvinyl halide stabilizers, such as cadmium oleate (i.e., cadmium dioleate), cadmium octoate, cadmium stearate, cadmium naphthenate, cadmium laurate, cadminum 2-ethyl hexoate, stannous oleate (i.e., stannous dioleate), stannous octoate, stannous naphthenate, stannous stearate, stannous p-tert. butyl benzoate, zinc octoate (i.e., zinc dioctoate), zinc oleate, zinc naphthenate, zinc stearate, and the like, and mixtures thereof, wherein preferably each acid group attached to the metallic radical has from 6 to 18 carbon atoms. Organic phosphite stabilizers (useful among other things to stabilize against oxidation) for polyvinyl halides may also be used, such as those described above (other than the asymmetric stabilizer of this invention), as well as other organic phosphites. Complex organic phosphite salts of cadmium or zinc may also be employed (for example, the reaction product of zinc oxide and dioctyl hydrogen phosphite). Each organic group of these additional organic phosphites preferably has from 4 to 18 carbon atoms. Mixtures of these additional stabilizers can be employed.

These additional stabilizers together with the asymmetric stabilizer of this invention are employed in a minor amount by weight sufficient to stabilize the vinyl halide polymer. In general, the total amount of these stabilizers employed, when the asymmetric stabilizer is used with the metal salts and/or organic phosphites, is from about 0.1 to 10 parts by weight per 100 parts by weight of the vinyl halide polymer. The asymmetric stabilizers, metal salt and/or organic phosphite are used in weight ratios relative to the polymer, sufficient to obtain the desired stabilizing action in the vinyl halide polymer. However, it is preferred that when the asymmetric stabilizer is used with one or more of the above metal salts, the ratios by parts by weight of the total amount of the asymmetric stabilizer to the total amount of he cadmium, tin, and/or zinc salt should be from about 1:5 to 5:1. When the asymmetric stabilizer is used with one or more other organic phosphite stabilizers, the preferred ratio by parts by weight of the total amount of the asymmetric stabilizer to the total amount of the organic phosphite is from about 5:1 to 1:1. When mixtures of the metal salts and the organic phosphites are used with the asymmetric stabilizers, it is preferred that these same parts by weight ratios should apply.

The resulting stabilized polymers in suitable amounts can be dissolved in organic solvents and used for solution coating of or casting on cans, fiber containers, cardboard boxes, and the like. The polymers can be made into films or sheets for packaging purposes (bread wrappers), shower curtains and the like, can be printed with decorative colors and used as wall coverings, can be used as a backing material in the manufacture of pressure sensitive adhesive tapes, can be calendered into woven or nonwoven fabric of synthetic or natural fibers to make upholstery material or luggage, can be used in the manufacture of cable jackets or electric wire insulation, can be used to make refrigerator and window gaskets, and can be used in making toys and athletic goods, etc. Also, the stabilized vinyl halide polymers of this invention, particularly the vinyl chloride-vinyl acetate copolymers, are particularly useful in making floor tiles, phonograph records and so forth. The stabilized polymers of the present invention are especially useful in making plastisols which can be very liquid casting compositions or nondripping dipping compositions. By use of suitable inert diluents or extenders known to the art, these stabilized resins, usually in the form of plastisols, can be made into organosols. Furthermore, these stabilized vinyl halide polymers can also be compounded to form impact-resistant, rigid polyvinyl chloride articles using appropriate amounts of polyurethanes, or styrene-acrylonitrile copolymers and/or butadiene-acrylonitrile copolymers, or acrylonitrile-butadienestyrene copolymers, etc., in order to make tubing, pipes, trays and so forth.

These compounding ingredients are employed in amounts well-known to those skilled in the art.

The stabilizers of the present invention as well as the other compounding ingredients can be mixed with the vinyl halide polymer on a rubber mill or in a Banbury or extruder at temperatures of 275 to 350° F. or dispersed in the vinyl halide polymer, including plasticizer, pigment, etc., and cast or fused and cured at 275 to 350° F. as known in the art. In general, the temperatures and times used for mixing, fusing and/or curing are those necessary to obtain the desired blending or mixing of the ingredients and desired physical properties without causing appreciable degradation of the vinyl halide polymer, as is well-known to those skilled in the art. They may also be mixed with the vinyl halide polymer in solvent and the solvent evaporated therefrom. They can also be mixed with a suspension or latex of the vinyl halide polymer and the water removed by filtration or after coagulation, but this is not too desirable as it may be difficult to get the desired amount of stabilizer in or on the polymer and some may be lost in the water. These asymmetric stabilizers can also be added initially or during polymerization of the vinyl halide polymer, although care should be exercised since their addition during polymerization may affect conversion rates, molecular weights, particle size, and so forth.

The following examples, in which all parts are parts by weight, will serve to illustrate the present invention with more particularity to those skilled in the art:

EXAMPLE I

Preparation of barium nonylphenate-decyl phenyl phosphite 240 parts Ba(OH)$_2$ monohydrate were dispersed in a mix of 127 parts of ethylene glycol monoethyl ether and 91 parts of dipropylene glycol methyl ether and 252 parts of a principally aliphatic hydrocarbon solvent, boiling point over 300° F. at about a temperature of 60 to 70° F., along with 287 parts of nonyl phenol (added after adding the Ba(OH)$_2$). The mix is brought to 260° F. for a few minutes, then cooled to about 210° F. before adding 250 parts of decyl diphenyl phosphite. The temperature of the resultant mix rose to 240° F.; external heat was then applied to raise the temperature to 260° F. and digested at 260° F. for about five minutes. The batch is then cooled to 180° F. and filtered. The resultant sol of ethers hydrocarbon and small excess of phosphite contains about 16% barium as barium nonylphenate-decyl phenyl phosphite.

In the above example, the nonyl phenol used may be substituted in whole or in part by equivalent weights of any of the before-mentioned phenols or substituted phenols or thiophenols with good results, the phenols having an alkyl substituent of 6 to 12 carbon atoms, and especially 8 and 9 carbon atoms in any of the various ortho, meta or para positions on the benzene ring are preferred. The decyl diphenyl phosphite may be substituted in whole or in part by an equivalent weight of any of the triorganophosphites having at least one aromatic group as previously mentioned. The barium hydroxide monohydrate may be substituted in whole or in part by an equivalent weight of the corresponding calcium and/or strontium hydroxide. Barium is preferred, however.

EXAMPLE II

About 100 parts of emulsion polymerized plastisol grade polyvinyl chloride resin (Geon-121) are mixed with 65 parts of dioctyl phthalate and 2 parts of the resulting filtrate or solution of Example I above, containing about 16.5 barium as barium nonyl phenate-dodecyl phenyl phosphite. A portion of the resulting plastisol is cast as a film on a highly polished chrome-plated steel plate (two square inches) and cured (and fused) at 350° F. for 10 minutes. The cured film is then stripped from the plate, and the surface of the chrome plate is visibly examined for plate-out (a misty appearance or deposit). There is no plate-out. When this procedure is repeated on the same plate for a total of twenty-five times, there is still no plate-out.

When an equivalent weight (based on phosphorus content) of any of the other above-mentioned asymmetric alkaline earth metal phenate-phosphites is substituted for the alkaline earth metal phenate-phosphite in Example II, generally equivalent results are obtained.

While the present invention has been described with particular reference to the prevention of heat degradation of vinyl halide polymers by incorporating therewith the novel asymmetric alkaline earth phenate-phosphite compounds disclosed herein, it will be appreciated that minor amounts of such asymmetric compound (alone or with other antidegradants) can be used likewise to retard or prevent degradation of organic substances subject to degradation (by heat, light, ozone, etc.) like the polystyrenes, polyethylene, polypropylene, ethylene-propylene copolymers, ethylene-propylene copolymers containing unprevent degradation of organic substances subject to degradation (by heat, light, ozone, etc.) like the polybutadienes made by other methods), butadiene-styrene copolymers (resinous and rubbery), acrylonitrile-butadiene-styrene type copolymers and grafts, synthetic natural rubber and or balata (cis/trans Ziegler or other type polymers), butyl rubber, polyesterurethanes, polyetherurethanes, polyether-esterurethanes, polyamides, nylon, butadiene-acrylonitrile type rubbers (Hycar or Paracril), Neoprene, polyesters (paraplexes, Dacrons, etc., chlorinated rubber, silicone rubbers, polyether rubbers and plastics, acrylates and methacrylates and their copolymers, alkyd resins, phenol-formaldehyde type resins, melamine type resins, the cellulosics, the monomers used to prepare such polymers, greases, natural rubber, balata, pine oils, terpenes, lubricating oils, fuel oils, gasoline, vegetable oils, and so forth, either alone, mixed with each other or with the vinyl halide polymer or copolymer. These asymmetric compounds are useful as well as a treating agent for other natural and synthetic organic materials.

It furthermore is to be understood that in accordance with the provisions of the patent laws and statutes, the particular compounds, compositions, products and methods shown and described herein are presented for purposes of explanation and illustration and that various changes and modifications of said compounds, compositions, products and methods can be made without departing from this invention.

What I claim is:

1. A compound having the general formula

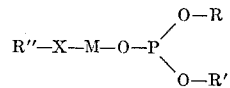

where R and R' are selected from the group consisting of alkyl, cyclohexyl, aryl, aralkyl, and alkaryl radicals and their halogen-substituted derivatives, where R and R' have from 4 to 18 carbon atoms, where M is selected from the group consisting of barium, calcium and strontium, and where R''—X— is selected from the group consisting of radicals of phenol, thiophenol, substituted phenols and substituted thiophenols, said substituted phenols and said substituted thiophenols having up to 19 carbon atoms in substituent groups, any one of which may have 1 to 18 carbn atoms in a single alkyl group, said substituent groups being selected from the group consisting of halogen, amino, methoxy and alkyl.

2. A compound according to calim 1 where M is barium.

3. A compound according to claim 1 where M is calcium.

4. A barium alkylphenate alkylphenyl-phosphite according to claim 1 having 4 to 18 carbon atoms in the alkyl group attached directly to an oxygen that is connected directly to phosphorus.

5. A calcium alkylphenate-diphenyl-phosphite according to claim 1 having an alkyl group of 8 to 12 carbons.

6. A compound according to claim 1 wherein M is barium and R''—O— is an alkylphenol radical and R and R' are alkylphenyl radicals having 8 to 12 carbon atoms in the alkyl groups thereof.

7. A compound according to claim 1 wherein M is calcium and R''—O— is an alkylphenol radical and R and R' are alkylphenyl radicals having 8 to 12 carbon atoms in the alkyl groups thereof.

8. A compound according to claim 1 wherein M is strontium and R''—O— is an alkylphenol radical and R and R' are alkylphenyl radicals having 8 to 12 carbon atoms in the alkyl groups thereof.

9. A compound according to claim 1 where M is strontium.

10. The method which comprises reaction in a diluent-solvent comprising at least one material selected from the group consisting of inert, high boiling point ethers and hydrocarbons, liquid at the reaction temperature, substantially equal molar amounts of R''—O—M—OH with

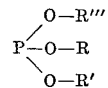

at a temperature of from 50° F. to about 400° F. sufficient to form

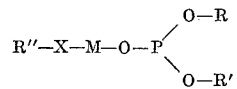

and R'''OH, where R and R' are selected from the group consisting of alkyl, cyclohexyl, aryl, aralkyl, and alkaryl radicals and their halogen-substituted derivatives, where R and R' have from 4 to 18 carbon atoms, where R''' is selected from the group consisting of aryl and alkaryl radicals having 6 to 18 carbon atoms and their halogen-substituted derivatives, where M is selected from the group consisting of barium, calcium and strontium, and where R''—X— is selected from the group consisting of radicals of phenol, thiophenol, substituted phenols and substituted thiophenols, said substituted phenols and said substituted thiophenols having up to 19 carbon atoms in substituent groups, any one of which may have 1 to 18 carbon atoms in a single alkyl group, said substituent groups being selected from the group consisting of halogen, amino, methoxy and alkyl.

11. The method which comprises reacting in a diluent-solvent comprising at least one material selected from the group consisting of inert, high boiling point ethers and hydrocarbons, liquid at the reaction temperature

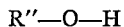

$M(OH)_2$ and

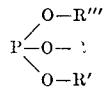

at a temperature of about 50° F. to about 400° F. to form at least a substantial amount of

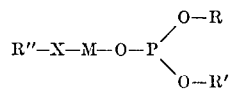

and the total of the moles of R''—O—H, plus any moles of carboxylic acid of 3 to 17 carbon atoms about equals the moles of $M(OH)_2$ present and the

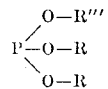

is present in molar amount at least substantially equal to the moles of $M(OH)_2$, where R and R' are selected from the group consisting of alkyl, cyclohexyl, aryl, aralkyl, and alkaryl radicals and their halogen-substituted derivatives, where R and R' have from 4 to 18 carbon atoms, where R''' is selected from the group consisting of aryl and alkaryl radicals having from 6 to 18 carbon atoms and their halogen substituted derivatives, where M is selected from the group consisting of barium, calcium and strontium, and where R''—X— is selected from the group consisting of radicals of phenol, thiophenol, substituted phenols and substituted thiophenols, said substituted phenols and said substituted thiophenols having up to 19 carbon atoms in substituent groups, any one of which may have 1 to 18 carbon atoms in a single alkyl group, said substituent groups being selected from the group consisting of halogen, amino, methoxy and alkyl.

References Cited

UNITED STATES PATENTS 3,207,723  9/1965  Bachner et al. _____ 260—967X

JOSEPH P. BRUST, Primary Examiner

A. H. SUTTO, Assistant Examiner

U.S. Cl. X.R.

44—76; 252—32.5, 32.7; 260—45, 95, 398.5, 814, 951, 958, 987